US007098269B2

(12) United States Patent
Lyons et al.

(10) Patent No.: US 7,098,269 B2
(45) Date of Patent: Aug. 29, 2006

(54) COMPRESSION MOLDED INORGANIC FIBER ARTICLES, AND METHODS AND COMPOSITIONS USED IN MOLDING SAME

(75) Inventors: David Charles Lyons, Red Wing, MN (US); Ted Victor Schroeder, Welch, MN (US)

(73) Assignee: HON Technology Inc., Muscatine, IA (US)

( * ) Notice: Subject to any disclaimer, the term of this patent is extended or adjusted under 35 U.S.C. 154(b) by 487 days.

(21) Appl. No.: 09/781,148

(22) Filed: Feb. 8, 2001

(65) Prior Publication Data

US 2003/0049575 A1 Mar. 13, 2003

(51) Int. Cl.
C08K 3/36 (2006.01)
C08K 3/34 (2006.01)
C08K 3/40 (2006.01)
C08L 33/00 (2006.01)

(52) U.S. Cl. ............... 524/847; 524/492; 524/556; 524/832

(58) Field of Classification Search ............. 524/492, 524/556, 832, 847
See application file for complete search history.

(56) References Cited

U.S. PATENT DOCUMENTS

| | | | |
|---|---|---|---|
| 663,811 A | 12/1900 | Dudgeon | |
| 2,348,614 A | 5/1944 | Dinkfeld et al. | |
| 2,737,444 A | 3/1956 | Person | |
| 2,875,747 A | 3/1959 | Fish | |
| 3,301,249 A | 1/1967 | Hendricks | |
| 3,304,931 A | 2/1967 | Rose | |
| 3,752,679 A * | 8/1973 | Moore | 106/38.35 |
| 3,758,317 A | 9/1973 | Moore et al. | |
| 3,886,076 A * | 5/1975 | Venable | 252/62 |
| 4,229,329 A * | 10/1980 | Bennett | 524/44 |
| 4,466,420 A | 8/1984 | Ernisse et al. | |
| 4,659,610 A * | 4/1987 | George et al. | 428/198 |
| 4,737,326 A | 4/1988 | Wirth et al. | |
| 4,746,565 A * | 5/1988 | Bafford et al. | 442/243 |
| 4,838,241 A | 6/1989 | Rieger | |
| 4,839,222 A * | 6/1989 | Jain | 442/375 |
| 4,869,664 A | 9/1989 | Wright et al. | |
| 4,875,464 A | 10/1989 | Shimek et al. | |
| 4,890,601 A | 1/1990 | Potter | |
| 4,950,362 A | 8/1990 | Steinau et al. | |
| 4,951,852 A * | 8/1990 | Rancoulle | 222/591 |
| 5,033,721 A * | 7/1991 | Gnyra | 266/280 |
| 5,092,313 A | 3/1992 | Blackburn et al. | |
| 5,388,566 A | 2/1995 | Smith et al. | |
| 5,518,678 A * | 5/1996 | Miyamoto et al. | 264/177.12 |
| 5,647,340 A | 7/1997 | Shimek et al. | |
| 5,688,568 A | 11/1997 | Wolf et al. | |
| 5,736,109 A * | 4/1998 | Howorth et al. | 422/179 |
| 5,915,374 A | 6/1999 | Susany | |
| 5,931,154 A | 8/1999 | Hussong et al. | |
| 5,941,237 A | 8/1999 | Shimek et al. | |
| 5,996,575 A | 12/1999 | Shimek et al. | |
| 6,004,493 A | 12/1999 | Hussong | |
| 6,006,743 A | 12/1999 | Shimek et al. | |
| 6,048,195 A | 4/2000 | Shimek et al. | |
| 6,077,467 A | 6/2000 | Sinsley | |
| 6,090,195 A * | 7/2000 | Andersen et al. | 106/162.51 |
| 6,180,257 B1 | 1/2001 | Brandt et al. | |
| 6,354,831 B1 | 3/2002 | Wilk, Jr. et al. | |
| 6,361,725 B1 | 3/2002 | Sinsley | |
| 6,443,726 B1 | 9/2002 | Atemboski | |
| 6,602,068 B1 | 8/2003 | Atemboski | |

FOREIGN PATENT DOCUMENTS

| | | |
|---|---|---|
| EP | 0194157 A2 | 7/1986 |
| EP | 0 267 671 A1 | 5/1998 |
| FR | 2629178 | 3/1988 |
| GB | 429115 | 5/1935 |
| GB | 1033987 | 6/1966 |
| GB | 2 068 106 A | 1/1981 |
| GB | 2179438 | 3/1987 |
| GB | 2 198 836 A | 6/1988 |
| JP | 07080815 | 3/1995 |
| JP | 07080815 A | 3/1995 |
| JP | 3171287 B2 | 5/2001 |
| WO | WO 01/61251 A1 | 8/2001 |
| WO | WO 02/063215 A2 | 8/2002 |

OTHER PUBLICATIONS http://www.woodstoves.co.uk/skamol.htm; Skamolex Insulating Bricks/Panels; Dec. 22, 2003; 4 pages.
Chemical Abstract No. XP000184374: "Heat–resistant electric insulating materials," Chemical Abstracts, vol. 100, No. 6, 1 pg. (Feb. 6, 1984).
Photographic (copies) material referencing Travis Industries Model No. DV XL Fireplace (7 photos).
Berkshire™ Cast Iron & Stone Gas Brochure from Lopi Stoves showing Ember–Fyre™ Burner (2 pages).
Drawing of burner assembly; 1 page (Jan. 2001).
Skamol Insulation High Temperature Insulation Manual; Skamolex V–1100—Vermiculite Block Insulation; 3 pages (Jan. 2001).

* cited by examiner

*Primary Examiner*—Tae H. Yoon
(74) *Attorney, Agent, or Firm*—Merchant & Gould P.C.

(57) ABSTRACT

A method of forming articles made of an inorganic fiber material using compression molding. In one respect, a method of forming an article, wherein the method includes providing a molding composition comprising inorganic fiber and an inorganic binder, and compression molding the molding composition into the article. In another respect, the method including providing a molding composition comprising inorganic fibers and a binder, and compression molding the molding composition into the article, wherein at least 75% by weight of the molded article is inorganic material. In some embodiments the cured binder is capable of withstanding temperatures of at least 600° F. without significant degradation or deterioration due to heat. Articles made by the use of such methods and a molding composition for use in compression molding an article are also included.

15 Claims, 9 Drawing Sheets

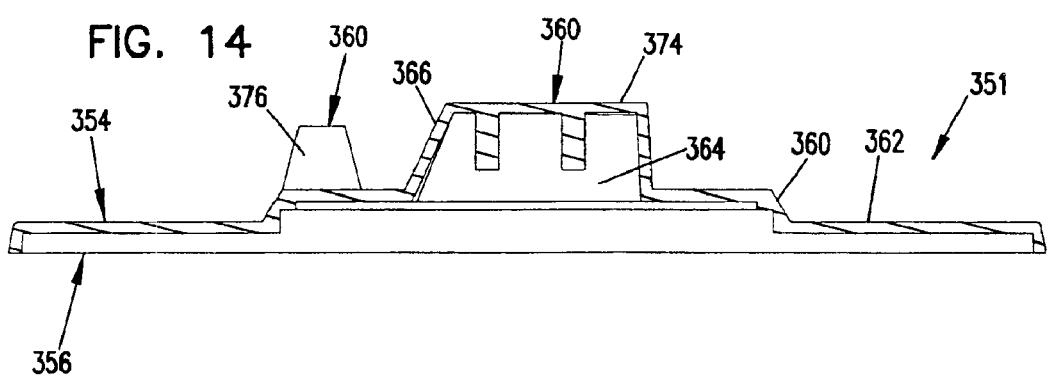
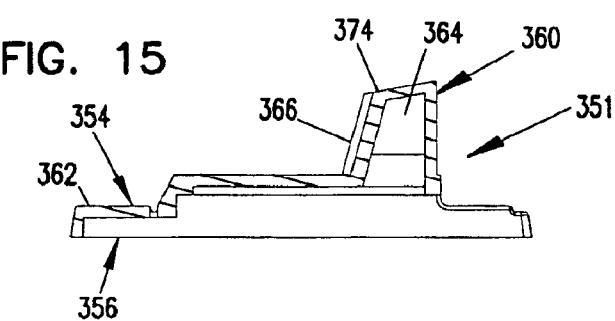

COMPRESSION MOLDED INORGANIC FIBER ARTICLES, AND METHODS AND COMPOSITIONS USED IN MOLDING SAME

FIELD OF THE INVENTION

The invention relates generally to a method of compression molding, and to articles produced using compression molding. The invention also relates generally to a molding composition including inorganic fibers for use in such compression molding methods and compression molded articles. More specifically, the invention relates to compression molding an inorganic fiber matrix to form articles made up of inorganic fiber.

BACKGROUND OF THE INVENTION

Vacuum formed articles made of ceramic or refractory fibers are generally known. For example, it is known to mix chopped dry ceramic fibers with water and various fillers to form a slurry, and then vacuum form the slurry into various articles composed mainly of chopped ceramic fibers. Such articles are often used in high temperature environments, and can withstand high temperatures without decomposition or deformation of the articles. For example, fireplace boxes and artificial fireplace logs have been produced by using such vacuum forming techniques.

Vacuum forming techniques of forming ceramic fiber articles have been very useful, but it would be desirable to provide an alternative method of forming ceramic fiber articles that does not involve vacuum forming. Vacuum forming techniques tend to be slow, dirty, and relatively complicated. Additionally, it would be desirable to provide ceramic fiber articles that have increased strength, dimensional stability, and thermal conductivity properties as compared to those formed using vacuum forming techniques.

SUMMARY OF THE INVENTION

The invention provides a method of forming articles made of an inorganic fiber material using compression molding. The use of compression molding to form inorganic fiber articles is distinctly different from vacuum forming techniques of making such articles. Additionally, in at least some embodiments, the use of compression molding to form inorganic fiber articles provides for an improvement over vacuum forming techniques, and in some embodiments, provides for inorganic fiber articles having desirable strength and integrity characteristics.

In one respect, the invention is directed to a method of forming an article, the method including: providing a molding composition comprising inorganic fiber and an inorganic binder, and compression molding the molding composition into the article.

In another respect, the invention is directed to a method of forming an article, the method including: providing a molding composition comprising inorganic fibers and a binder, and compression molding the molding composition into the article, wherein at least 75% by weight of the molded article is inorganic material.

In another respect, the invention is directed to a method of forming an article, the method including: providing a molding composition comprising inorganic fibers and a binder, and compression molding the molding composition into the article such that the binder cures, wherein the cured binder is capable of withstanding temperatures of at least 600° F. without significant degradation or deterioration due to heat.

In another respect, the invention is directed to a method of forming an article, the method including: providing a molding composition comprising inorganic fibers and a binder, and compression molding the molding composition into the article, wherein the article is capable of withstanding temperatures of at least 600° F. without significant degradation or deterioration due to heat.

In another respect, the invention is directed to articles made by the use of such methods.

In another respect, the invention is directed to a molding composition for use in compression molding an article.

In some preferred embodiments, the compression molded inorganic fiber articles are intended for use in high temperature environments. For example, some embodiments are contemplated for use as a component of: a fireplace assembly, a grill assembly, a campfire assembly, a burner assembly, or the like. Examples of such articles can include a fireplace box, a surround, a combustion chamber, a fireplace door, a log or log set, a burner, and a refractory member. However, as will be understood by those of skill in the art and others, while certain specific embodiments of the invention will be illustrated in describing preferred embodiments of the invention, the invention is not to be limited to use in such embodiments. The invention is contemplated for use in a broad variety of applications and industries, and to create inorganic fiber articles made of any desired shape or size. These and other modifications of the invention will be understood by those skilled in the art in view of the following description of the invention, with reference to specific embodiments thereof.

BRIEF DESCRIPTION OF THE DRAWINGS

Referring to the figures, wherein like numerals represent like parts throughout the several views:

FIG. 14 is a schematic cross-sectional view of the monolithic panel of FIG. 13, taken along line 14—14 of FIG. 13;

FIG. 15 is a schematic cross-sectional view of the monolithic panel of FIG. 13, taken along line 15—15 of FIG. 13.

DETAILED DESCRIPTION OF THE PREFERRED EMBODIMENT

The invention relates to the use of compression molding techniques to mold a matrix including inorganic fibers into useful articles. In some embodiments, methods of the invention generally include providing a molding composition including inorganic fibers and a binder, and compression molding the molding composition into the article.

Compression Molding

The first step involved in one embodiment of such a molding method entails providing the molding composition. The molding composition generally includes inorganic fibers, binder, carrier solvent, and optional additives. A more detailed discussion of some embodiments of the molding composition will be provided below.

The next step entails compression molding the molding composition. Compression molding as used herein generally involves the use of a heated mold and compressive pressure produced by the mold to form the moldable composition into a desired shape. Many compression molding techniques may be used. For example, in some embodiments the mold comprises a plurality of matched dies, and in some embodiments, a pair of dies, for example male and female dies, that mate with each other to form a mold cavity or mold cavities. In some embodiments, the dies are attached to equipment that is designed to bring the dies together with enough compressive pressure to perform the molding. It is contemplated that in other embodiments, the weight of the dies can create enough compressive pressure to perform the molding. The dies are typically preheated to a molding temperature, and a measured quantity of moldable composition including inorganic fiber is placed in the heated mold. In some embodiments, the moldable composition is placed in the heated mold when the mold is in the open position. The mold is then closed and the moldable composition, through pressure applied from the closing of the mold, fills the mold cavity. Continued heating at least partially cures the moldable composition within a relatively short period of time, in some embodiments within a matter of minutes, such that the molded article retains its shape. Pressure is then released, the dies are separated, and the molded article is removed from the mold.

It should also be understood that in some embodiments of compression molding, the moldable composition is forced into the heated mold through one or more injection ports using appropriate injection techniques when the mold is in the closed position. The moldable composition, through pressure from the injection process, and compression from the closed mold dies, fills the mold cavity, and is formed into the desired shape. Therefore, it will be understood that as used herein, the terms "compression molding" is intended to include embodiments using all types of known compression molding, including such injection techniques.

One particular embodiment of compression molding the moldable composition including inorganic fiber will now be described, with reference to FIGS. 10–12.

Figure 10:
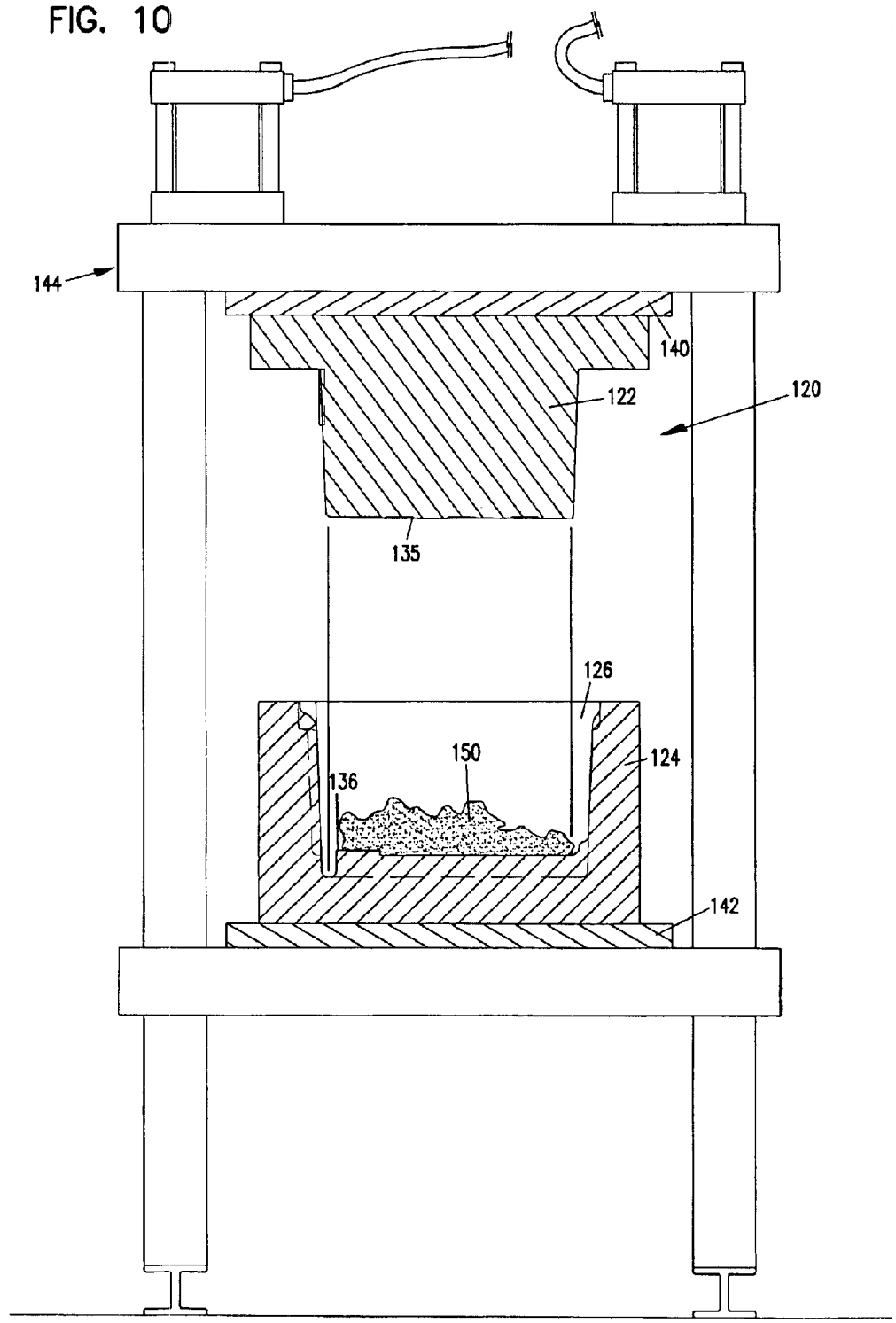
FIG. 10 is a cross-sectional view of the compression mold used to mold the combustion chamber of FIG. 1 showing the mold in an open position with unmolded inorganic fiber composition in the bottom portion of the mold.
Figure 11:
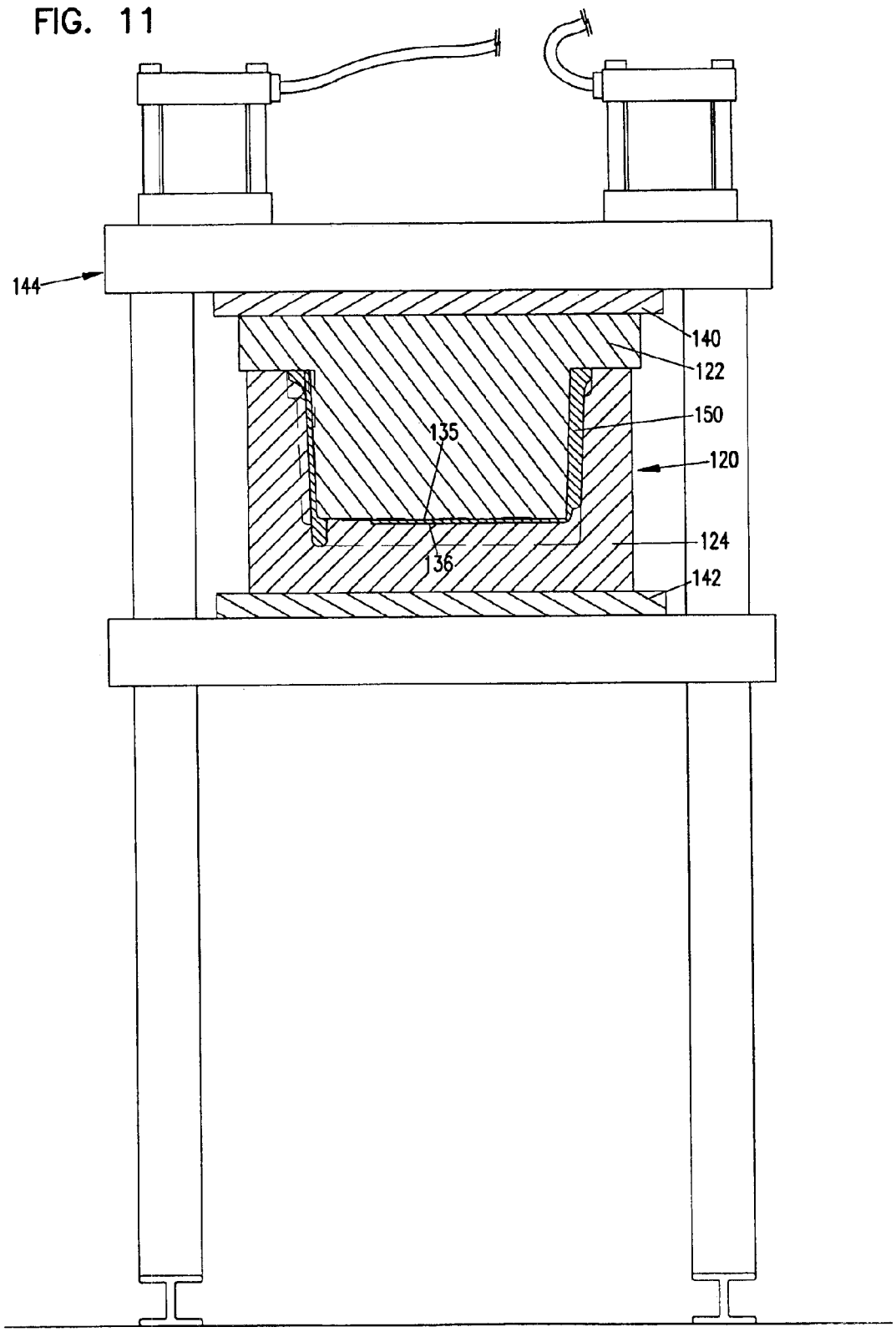
FIG. 11 is a cross-sectional view of the compression mold of FIG. 10 showing the mold in a closed position and molding the inorganic fiber composition.

Referring to FIG. 10, a cross section of a compression mold 120 in an open position is shown, including a top die 122 and a bottom die 124 which together define a mold cavity 126 in the desired shape of the article to be molded. In the embodiment shown, the article to be molded is a monolithic combustion chamber for use in a fireplace assembly, for example a combustion chamber of a gas fireplace assembly. The mold cavity 126 includes an upper surface 135 and a lower surface 136. Typically, the mold surfaces 135 and 136 are hardened and highly polished. The mold may also include ejector pins (not shown), or other such structures as generally known in the art, to aid in the removal of the article when the molding process is complete. The dies are mounted on platens 140 and 142 of a press 144, for example a vertical hydraulic press. The press 144 is operated to open and close the mold 120, and typically is able to create the necessary compression pressure for molding.

The dies 122 and 124 are preheated to a predetermined molding temperature. In some embodiments, the molding temperature is over 400° F., preferably in the range of 425° F. to 475° F., or in the range of 440° F. to 460° F., and more preferably about 450° F. In some embodiments, the dies 122 and 124 are preheated using heated platens 140 and 142, and heat is transferred from the platens 140 and 142 to the dies 122 and 124.

The molding composition including inorganic fibers 150 is then introduced into the lower die 122, and the press 144 is operated to close the mold 120. (FIG. 11). As the mold 120 is closed, an appropriate amount of compression molding pressure is applied to achieve the desired molding. As will be understood by those of skill in the art and others, the necessary amount of molding pressure is dependent upon many variables, for example the size and complexity of the article being molded, the properties of the particular molding composition used, and other such parameters. In some embodiments, a compression pressure of up to 50 tons is applied. In other embodiments, a compression pressure in the range 1 to 20 tons, or in the range of 3 to 10 tons is applied.

The moldable composition 150, through pressure applied from the closing of the mold 120, fills and is formed into the shape of the mold cavity. Continued heating of the composition in the mold at least partially cures the moldable composition within a relatively short period of time, in some embodiments within a matter of minutes, such that the molded article retains its shape. The amount of time necessary can vary, depending upon the size and shape of the part, the properties of the particular molding composition used, and other such parameters.

Figure 12:
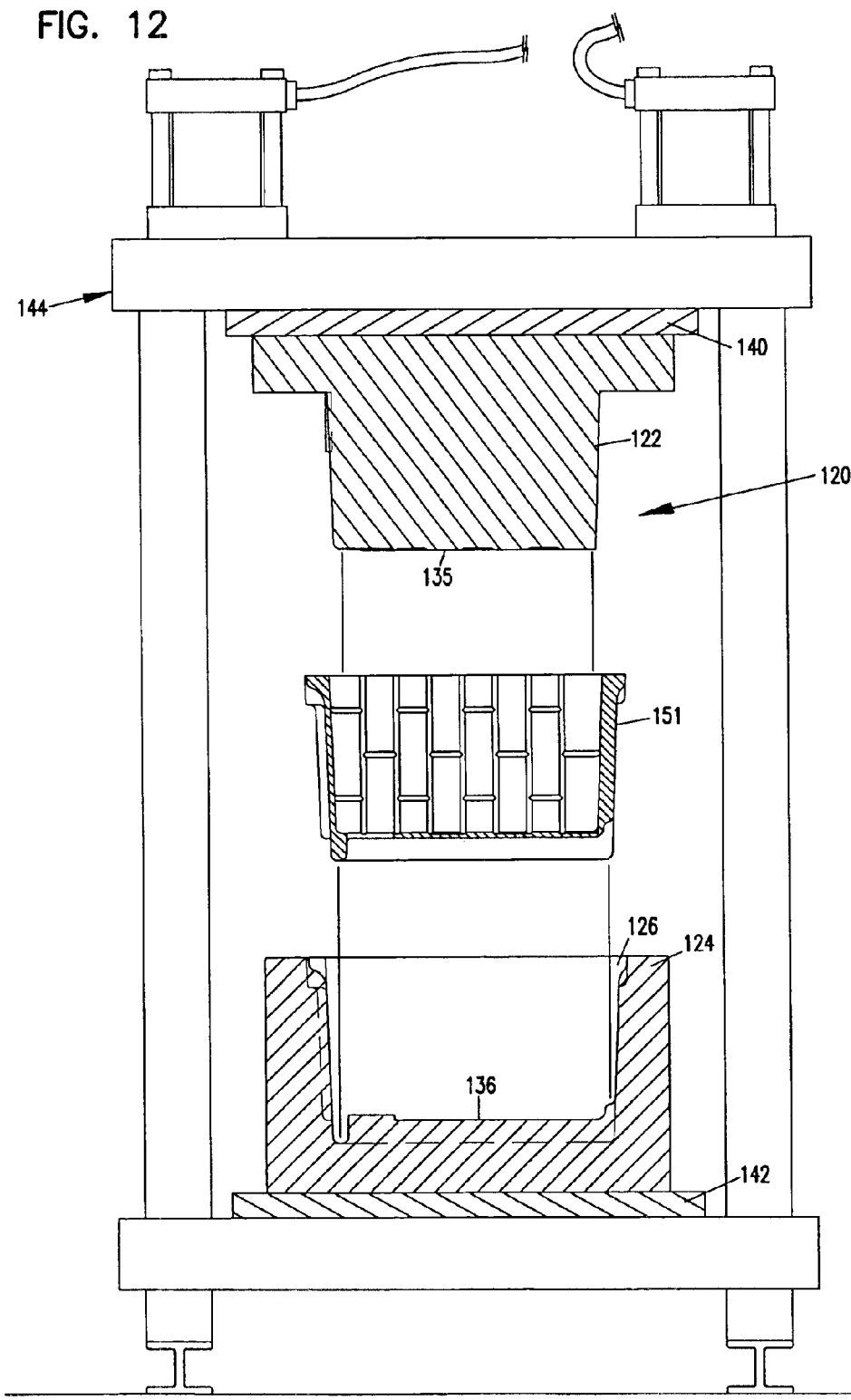
FIG. 12 a cross-sectional view of the compression mold of FIG. 10 showing the mold in an open position and the compression molded combustion chamber in accordance with one embodiment of the invention.

Referring now to FIG. 12, the press is operated to separate the dies 122 and 124, and the molded article 151 is removed from the mold 120. After the molding process is complete, and the molded article is removed from the mold, it can be further dried by either air drying, or in some cases, by oven drying or firing. In some embodiments, however, the article can be dried by being held in the heated mold for a longer period of time to achieve the desired drying.

For larger articles, for example, a molded combustion chamber, additional drying can be achieved by oven drying after removal from the mold at a temperature in the range of 350° F. and 1800° F., more preferably in the range of 650° F. to 750° F. for a sufficient amount of time to drive off any of the remaining excess carrier solvent, for example water, from the mold composition. The dry time depends greatly upon the method of drying used, and the article being formed.

After the drying, the article can be trimmed or machined to a final desirable shape, if needed, and colored as desired.

Molding Composition Formulation

The molding composition generally includes inorganic fibers, binder, carrier solvent, and optional additional additives.

The inorganic fiber is generally described as fibers made of one or more inorganic materials. Some examples of inorganic fibers include glass fibers, ceramic fibers, refractory fibers, refractory ceramic fibers (RCF), mineral fibers, or other like inorganic fibers, or mixtures thereof. Such fibers can include, for example, staple fiber, spun fiber, continuous fiber, bulk fiber, filament fiber or wool fibers or the like, or mixtures thereof. Additionally, the fibers can be in a broad variety of forms, for example, in a crystalline or polycrystalline form, or the like, or mixtures thereof. Refractory ceramic fibers (RCFs), along with fibrous glass and mineral wool, are often times grouped as man-made materials generally referred to as synthetic vitreous fibers (SVF). All these products are made from molten masses of raw materials, under controlled conditions.

In some embodiments the fibers are selected from chopped fiber glass, alumina silicate RCF, or mixtures thereof. In some embodiments, especially those for use in high temperature environments, it is preferable to use fibers that can withstand high temperatures. For example, in such embodiments, it is preferable to use fibers that can withstand temperatures of at least 800° F., more preferably at least 1000° F., more preferably at least 1200° F., and more preferably 1300° F., without significant degradation or deterioration due to the heat.

The size of the inorganic fibers can vary greatly, depending upon many variables, for example the particular article being molded, or the desired properties or characteristics of the molding composition or the finished article. In some embodiments, the fibers range in length from less than 1/16 of an inch to two inches, preferably from 1/16 of an inch to 1 inch, and more preferably from 1/8 of an inch to 1/2 of an inch. In some embodiments, the fibers have a diameter in the range of 1 micron to 30 microns, preferably in the range of 4 microns to 9 microns, and more preferably in the range of 5 microns to 7 microns.

The fibers can make up a major component of the composition, for example in some envisioned embodiments, up to 80% or more of the composition. However, in some embodiments, a significant amount of fillers, for example inorganic fillers, can be used, thereby reducing the necessary concentration of inorganic fiber.

The binder used acts to bind the components of moldable composition together when cured during the molding process. The binder includes inorganic or organic binders generally known, or mixtures thereof. Examples of binders include silica, sodium, calcium, and magnesium based binders, and the like, or mixtures thereof. Other examples include polymeric materials, petroleum distillate, polyethylene oxide, and the like, or mixtures thereof. In some embodiments, the binder can be hydrous, anhydrous, crystalline, or amorphous. In some embodiments, the binder within the molding composition in the form of a dispersion, emulsion, slurry or solution with the carrier medium.

In some embodiments, especially those for use in high temperature environments, it is preferable to use binders that can withstand high temperatures. For example, in such embodiments, it is preferable to use binders that can withstand temperatures of at least 600° F., or at least 800° F., or least 1000° F., or at least 1200° F., and more preferably at least 1300° F., without significant degradation or deterioration due to the heat. The preferred binders include amorphous silica.

The carrier solvent typically acts to create a dispersion, emulsion, slurry or solution with the rest of the components. Preferably, the moldable composition is in the form of a slurry. In most embodiments, the carrier solvent is burned off or leaves due to the heat during the molding process, and little or none remains in the finished molded article. The preferred carrier solvent for most embodiments is water. In at least some embodiments, the moldable composition preferably includes water as the primary carrier solvent. The composition preferably has a moisture content in the range of 20 to 35%, more preferably 23 to 30%, and most preferably 25 to 27% by weight of the total composition.

Additional additives can optionally be included within the molding composition to provide the molding composition or the final molded article with desirable properties. For example, additives can be included to enhance the emulsion or dispersion of the components of the composition, to enhance the moldability of the composition or to enhance the appearance or physical properties of the molded article. Some examples of additives include inorganic or organic fillers, surfactants, diluents, thickeners, solvents, dyes or colorants, or other appearance enhancing materials, and the like, or mixtures thereof.

Fillers can be used, for example, to increase the volume of the composition and reduce the necessary amount of inorganic fiber. Additionally, some fillers can be added to impart desired properties to the final molded article. Examples of fillers include inorganic or organic fillers that are compatible with the other components in the composition. Preferred fillers include inorganic fillers, for example silica compounds, such as alumina silicate, crystalline silica, and the like. Another example of an inorganic filler includes ceramic micro spheres, and the like.

In some embodiments, an example of a preferred emulsion or dispersion agent is petroleum distillate, hydrotreated light. This material can also act as a carrier in the formulation. Nonylphenol polyethylene oxide is another example of a dispersing or emulsifying agent that can also act as a surfactant.

In some embodiments, an organic polymer, such as an acrylic polymer, is added to the composition to act as a dispersing agent, and also to act as a molding thickener to help the composition hold shape when it is being molded. Typically, this type of material is burned off during the molding process. The organic polymer can be present in the composition in the range of about 0.1 to about 5%, more preferably in the range of 0.1 to 1%, and more preferably in the range of 0.1 to 0.5%, by weight of the total composition. It is contemplated that these, and many other additives can be used in compositions embodying the invention.

Representative constituent concentrations for base components of some examples of moldable compositions embodying the invention can be found in Table 1, wherein the values are given in wt. % of the ingredients in reference to the total composition weight.

TABLE 1

| Component | Exemplary wt. % Range | Preferred wt. % Range | More Preferred wt. % Range |
|---|---|---|---|
| Inorganic Fiber | up to 80%, but preferably 75% or less | 25% or less | 10% or less |
| Binder | 10 to 40% | 15 to 35% | 20 to 30% |
| Carrier Solvent | 15 to 45% | 20 to 40% | 25 to 35% |
| Additives | 0 to 70% | 25 to 80% | 33 to 54% |

Some embodiments of moldable compositions comprise the constituent concentrations for base components as found in Table 2, wherein the values are given in wt. % of the ingredients in reference to the total composition weight.

TABLE 2

| Component | Example wt. % Range | Preferred wt. % Range | More Preferred wt. % Range |
| --- | --- | --- | --- |
| Inorganic Fiber | 25% or less | 10% or less | 5% or less |
| Inorganic Binder | 10 to 40% | 15 to 35% | 20 to 30% |
| Water | 15 to 45% | 20 to 40% | 25 to 35% |
| Inorganic Filler | 15 to 70% | 20 to 60% | 30 to 54% |
| Other additives | 0 to 10% | 0 to 5% | 0.1 to 2% |

In some embodiments, the molding composition is made by mixing the inorganic fibers and any filler with a binder solution that is in aqueous form and includes any additional additives. After the combination of fibers, filler and binder solution are mixed together, they are agitated so that the fibers completely adsorb the binder solution. After the mixing and agitation occurs, a slurry or paste is formed that is of a consistency that permits the mixture to be used to fill the compression mold, and is ready to be compression molded.

One specific example of a molding composition comprises the constituent concentrations for base components as found in Table 3, wherein the values are given in wt. % of the ingredients in reference to the total composition weight.

TABLE 3

| Component | Weight Percent |
| --- | --- |
| Chopped Fiber Glass | 3.3% |
| Colloidal Silica (in a 50% water solution) | 60% |
| Alumina Silicate | 34% |
| Acrylic Polymer | 0.2% |
| Ceramic Micro spheres | 2.5% |

Another specific example of a molding composition comprises the constituent concentrations for base components as found in Table 4, wherein the values are given in wt. % of the ingredients in reference to the total composition weight.

TABLE 4

| Component | Weight Percent |
| --- | --- |
| Chopped Fiber Glass | 3.66% |
| Colloidal Silica (in a 50% water solution) | 19% |
| Alumina Silicate | 48.35% |
| Acrylic Polymer | 0.22% |
| Ceramic Micro spheres | 2.77% |
| Water | 26% |

One preferred moldable slurry of ceramic fibers is a product named THERMOSEAL® Moldable P244, which is commercially available from Mid-Mountain Materials Incorporated of Seattle, Wash. Another preferred moldable slurry of ceramic fibers is a product named THERMOSEAL® Moldable P254, which is commercially available from Mid-Mountain Materials Incorporated of Seattle, Wash.

In some embodiments, the molding composition or the finished article, are made up of primarily inorganic materials. For example, in some embodiments, the molding composition or the finished article, include at least 75% by weight inorganic material, or in other embodiments, at least 90% by weight inorganic material, and in still other embodiments, at least 95% by weight inorganic material, and sometimes at least 99% by weight inorganic material. It is also contemplated that in some embodiments, the molding composition, prior to molding, includes a mixture of inorganic and organic material, but that a significant portion of the organic material will be burned off, or leave during the molding process, leaving the final compression molded article to be made up of primarily inorganic materials. In some embodiments, especially those for use in high temperature environments, it is preferable that the final compression molded article comprises materials that can withstand high temperatures. For example, in such embodiments, it is preferable to use fibers, binders, or any other optional ingredients, such as fillers, that when molded into the final article can withstand temperatures of at least 600° F., or at least 800° F., or least 1000° F., or at least 1200° F., and more preferably at least 1300° F., without significant degradation or deterioration due to the heat.

Combustion Chamber Enclosure

FIGS. 1–9 show one embodiment of a compression molded article that was molded in accordance with the invention. Specifically, a compression molded monolithic combustion chamber enclosure 251 for use in a fireplace, for example a gas fireplace, is shown. The combustion chamber enclosure 251 defines an outer surface 254 and inner surface 256. The combustion chamber enclosure includes a bottom panel 258, side panels 260 and 262, a top panel 264, and a back panel 265. Optionally, the combustion chamber enclosure 251 can define one or more apertures that are formed through the one or more of the panels during the compression molding process. Alternatively, the one or more apertures can be formed through one or more of the panels after the molding process.

In one embodiment, the top panel 264 defines an aperture 268, for example, for venting combustion products, the back panel 265 defines an aperture 270, for example, for supplying air or gas to the combustion chamber 251, and the bottom panel 258 defines an aperture 272, for example, for supplying air or gas to the combustion chamber, as shown in FIGS. 1–9. In this embodiment, the aperture 268 and the aperture 272 were formed in the combustion chamber in post molding operations, while the aperture 270 was formed in the combustion chamber during the molding process. The combustion chamber enclosure 251 includes raised portions 274 on the outer surface 254, for example, to provide a space between the combustion chamber enclosure 251 and a structure into which the combustion chamber enclosure is eventually inserted.

Figure 1A:
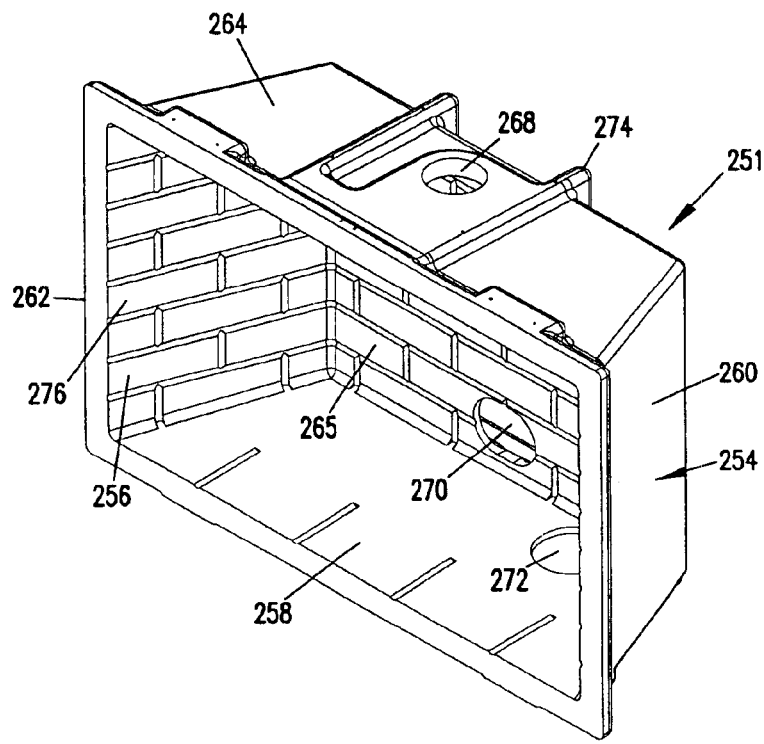
FIG. 1 is a front perspective view of a compression-molded combustion chamber in accordance with one embodiment of the invention.
FIG. 1B is a back perspective view of the compression molded combustion chamber of FIG. 1.
Figure 1B:
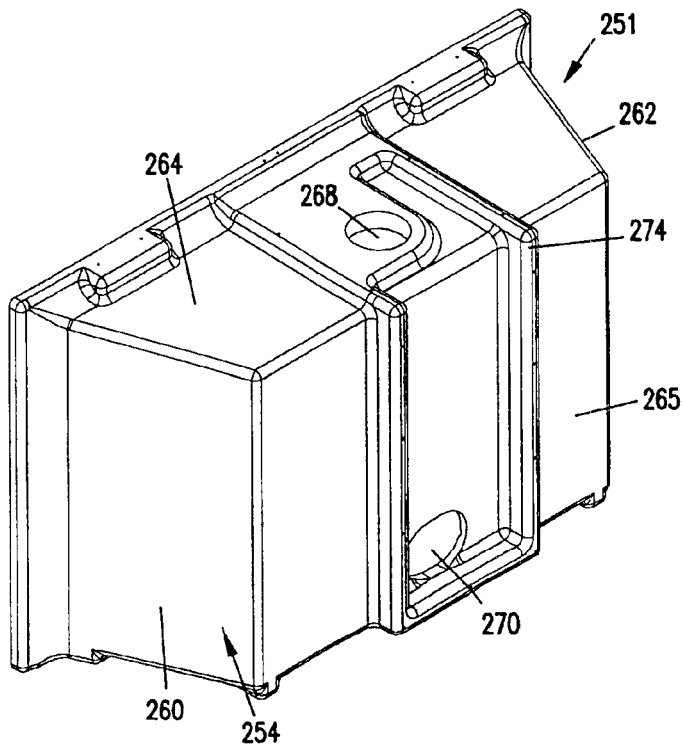
Figure 2:
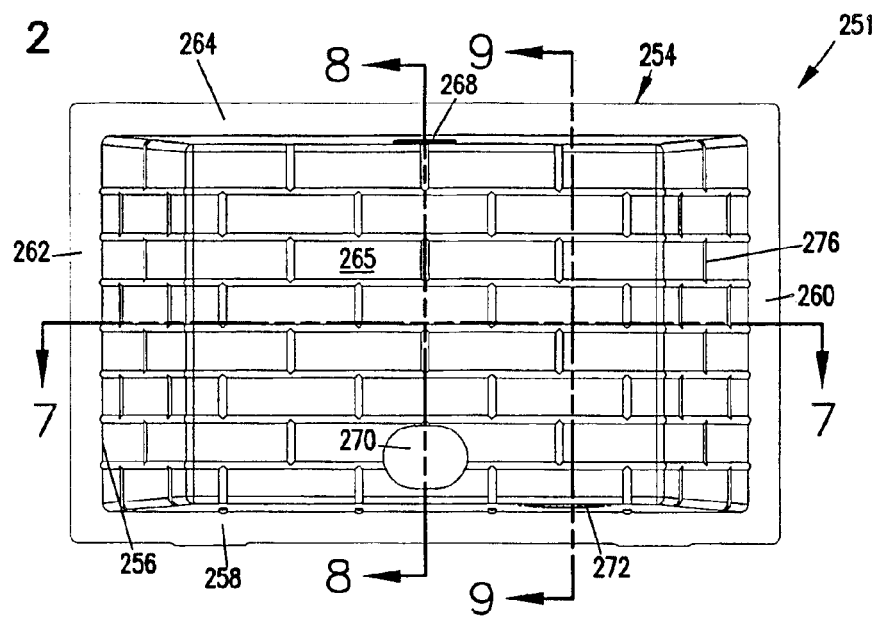
FIG. 2 is a front view of the compression molded combustion chamber of FIG. 1.
Figure 3:
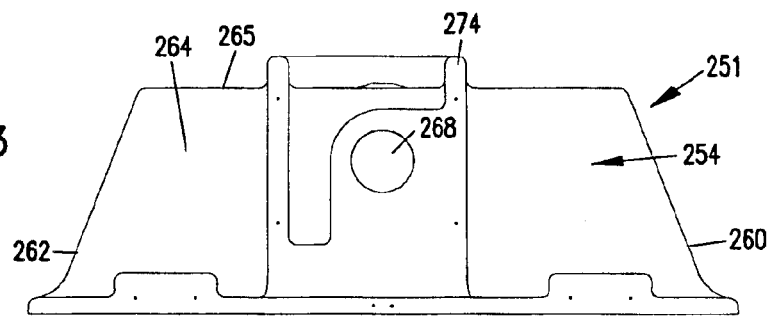
FIG. 3 is a top view of the compression molded combustion chamber of FIG. 1.
Figure 4:
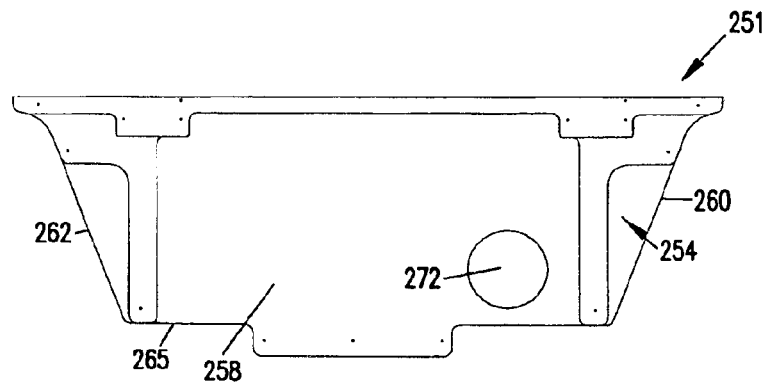
FIG. 4 is a bottom view of the compression molded combustion chamber of FIG. 1.
Figure 5:
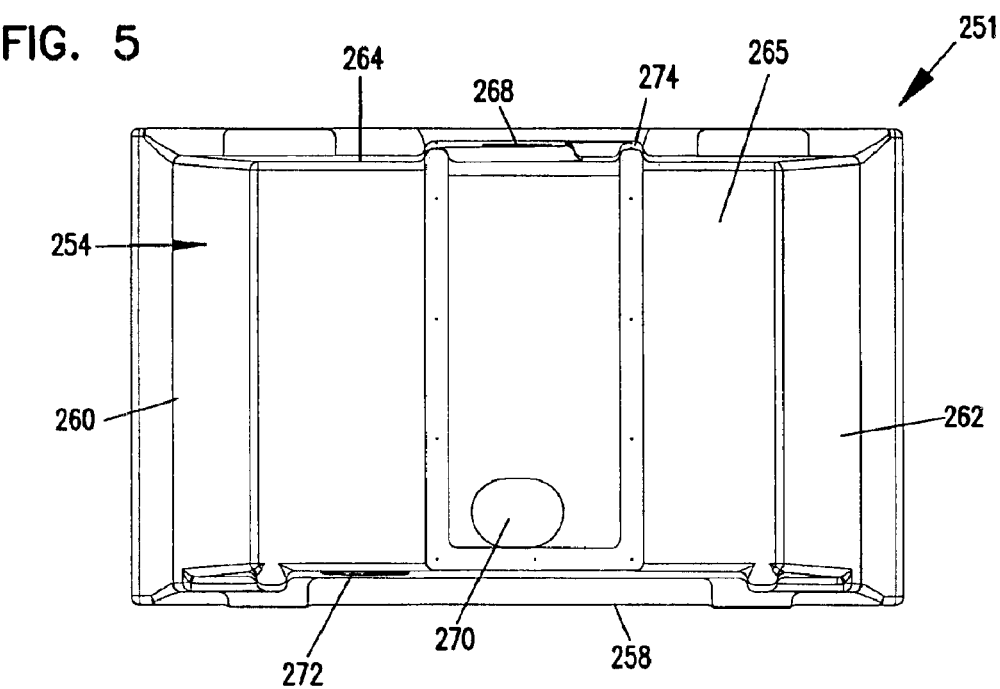
FIG. 5 is a back view of the compression molded combustion chamber of FIG. 1.
Figure 6:
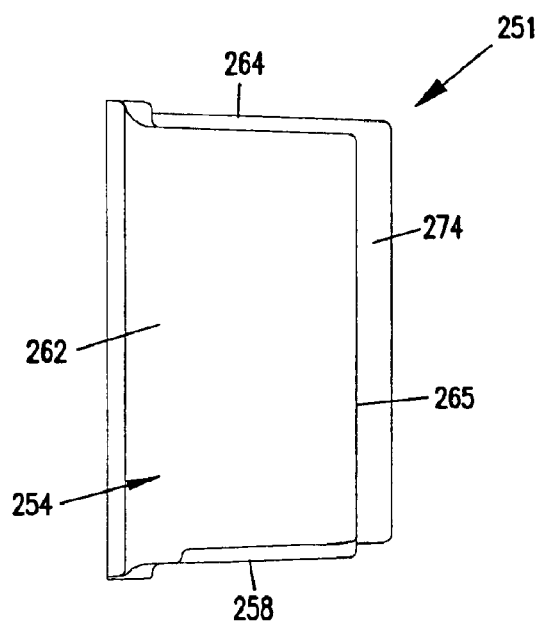
FIG. 6 is a side view of the compression molded combustion chamber of FIG. 1.
Figure 7:
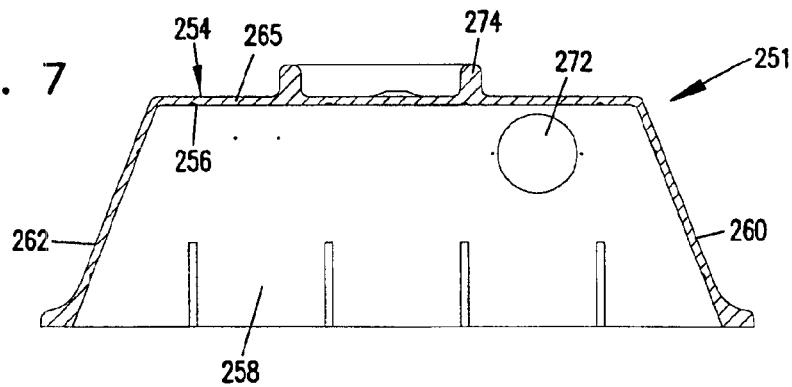
FIG. 7 is cross-sectional view of the compression molded combustion chamber of FIG. 1 taken along line 7—7 of FIG. 2.
Figure 8:
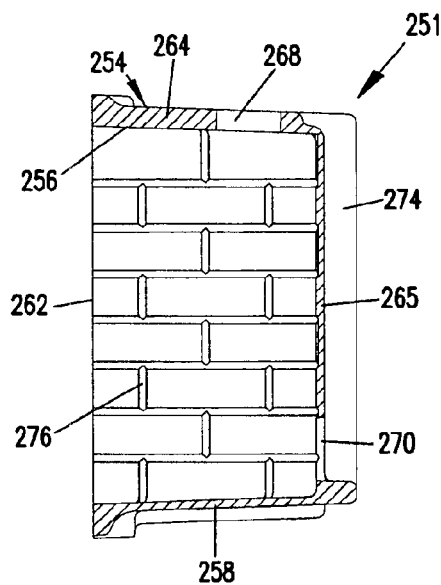
FIG. 8 is a cross-sectional view of the compression molded combustion chamber of FIG. 1 taken along line 8—8 of FIG. 2.
Figure 9:
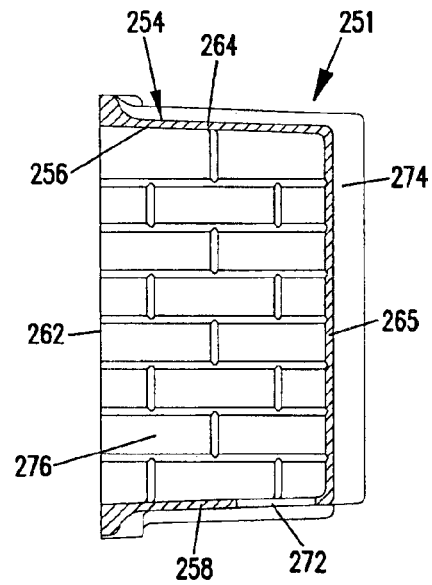
FIG. 9 is a cross-sectional view of the compression molded combustion chamber of FIG. 1 taken along line 9—9 of FIG. 2.

The combustion chamber enclosure 251 can also include a design, such as a masonry design 276 formed into at least a portion of the inner surface 256. For example, FIG. 2 shows a simulated brick design 276 on the back panel 265 and side panels 260 and 262 of the combustion chamber enclosure. The masonry design can also be formed into the bottom panel 258 and top panel 264. Other masonry designs include, but are not limited to, stone or concrete. Alternatively, the combustion chamber enclosure can be formed without a masonry design, or with other designs.

Burner Panel

Figure 13:
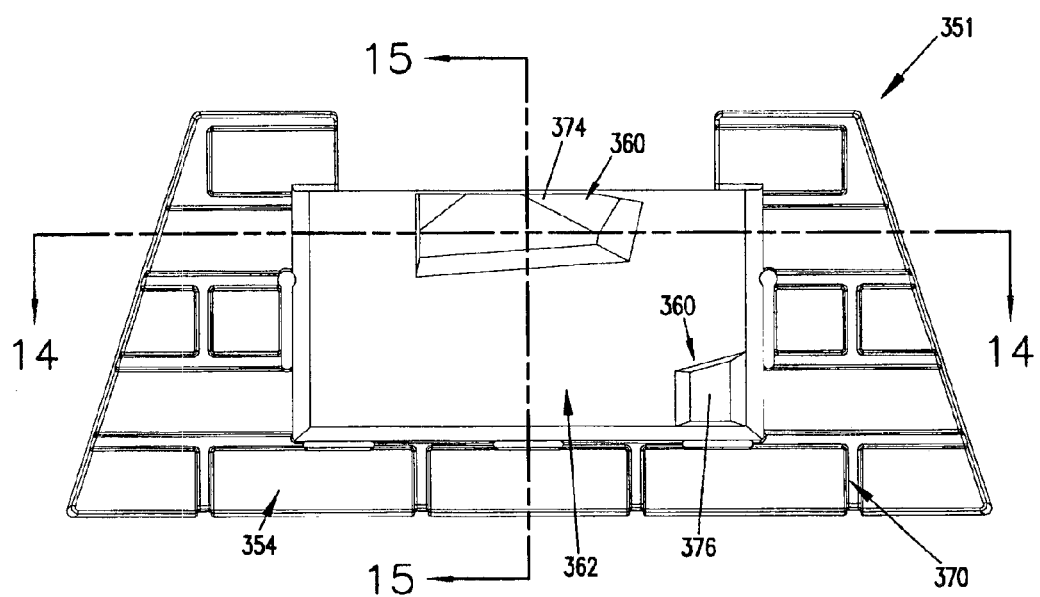
FIG. 13 is a schematic top view of a monolithic panel for a gas burner according to one embodiment of the invention.

Another particular embodiment of an article that can be molded in accordance with the invention is shown in FIGS. 13–15. Specifically, a compression molded monolithic gas burner panel 351 is shown. The monolithic gas burner panel 351 defines a top surface 354 and a bottom surface 356. The top surface 354 defines a raised upper portion 360 and a lower portion 362. The raised upper portion 360 is defined by one or more elevated areas 374 and 376, shown for example, in FIGS. 14 and 15. The elevated area or areas 374 and 376 can be formed into any number of generic shapes including, but not limited to, rounded, trapezoid, crescent, or any other desired shape. For example, FIGS. 13–15 show elevated areas of a general trapezoid shape having areas of irregular shape. Optionally, the elevated area is formed into at least one preformed log that includes contours and detail in the top surface of the burner panel that simulates a log.

The bottom surface 356 defines at least one cavity 364 below at least one of the elevated areas 374 and 376. A portion of at least one cavities 364 extend above at least a portion of the top surface 354, as shown in FIGS. 14 and 15. In some embodiments, the bottom surface 356 defines a cavity 364 under each of the elevated areas 366. In other embodiments, there can be elevated areas that do not include a cavity there under that extends above the top surface 354. The burner panel 351 can be formed as a bottom panel of a combustion chamber enclosure, such as the combustion chamber enclosure shown in FIGS. 1–9.

The burner panel 351 can optionally define one or more apertures, for example burner apertures that are formed into the burner panel 351 during the compression molding process. Alternatively, the one or more apertures can be formed into the burner panel after the molding process.

The burner panel 351 can also include a masonry design 370 formed, for example, into a portion of the lower portion of the top surface. For example, FIG. 13 shows a simulated brick design on part of the lower portion. Other masonry designs include, but are not limited to, stone or concrete. Alternatively, the burner panel can be formed without a masonry design, or with another design.

Although a number of specific embodiments of the invention for use in fireplace or burner applications have been discussed, it will be understood by those of skill in the art and others, the invention is contemplated for use in and to form a broad variety of articles made of any desired shape or size and for use in a broad variety of applications or industries. Some examples of additional structure contemplated in the fireplace or burner industry include compression molded combustion chamber enclosures or burners for direct vent, universal vent, B-vent, dual direct vent, multi-sided unit having two or three glass panels as combustion chamber side panels, or in any fireplace or combustion unit, stove, or insert are contemplated. Some specific examples of other fiber structures that can be molded in accordance with the compression molding methods of this invention are disclosed in U.S. Pat. Nos. 5,941,237 and 5,996,575, which are herein incorporated by reference.

The above specification provides a basis for understanding the broad meets and bounds of the invention. Variations within the concepts of the invention are apparent to those skilled in the art.

We claim:

1. A compression molding composition for use in compression molding an article said composition comprising:

an inorganic fiber, an inorganic binder, and a carrier solvent, wherein at least a portion of the inorganic binder is suspended in at least a portion of the carrier solvent;

wherein the composition comprises less than 25% by wt. inorganic fiber in an amount sufficient to be bound by the inorganic binder during the compression molding to form the article;

wherein the composition comprises in the range of 15 to 35% by wt. inorganic binder wherein the composition comprises in the range of 15 to 45% by wt. carrier solvent; and wherein the composition comprises in the range of 0 to 70% by wt. additional solid additives.

2. The composition of claim 1, wherein the additional additives include an inorganic filler, and the inorganic filler is in the range of 15 to 70% by weight of the total composition.

3. The composition of claim 1, wherein the additional additives include an organic polymer, and the organic polymer is in the range of 0.1 to 0.5% by weight of the total composition.

4. The composition of claim 3, wherein the organic polymer is an acrylic polymer.

5. The composition of claim 3, wherein the organic polymer act as a molding thickener to help the composition hold shape when it is being molded.

6. The composition of claim 1, wherein the carrier solvent is water.

7. The composition of claim 6, wherein the composition has a moisture content in the range of 20 to 35% by weight of the total composition.

8. The composition of claim 7, wherein the composition has a moisture content 23 to 30% by weight of the total composition.

9. The composition of claim 8, wherein the composition has a moisture content in the range of 25 to 27% by weight of the total composition.

10. The composition of claim 1, wherein the inorganic binder is colloidal silica.

11. The composition of claim 1, wherein the composition is less than 10% by wt. inorganic fiber.

12. The composition of claim 11, wherein the composition is less than 5% by wt. inorganic binder.

13. The composition of claim 1, wherein the composition is in the range of about 20 to 30% by wt. inorganic binder.

14. The composition of claim 1, wherein the composition is in the range of 20 to 40% by wt. carrier solvent.

15. The composition of claim 14, wherein the composition is in the range of 25 to 35% by wt. carrier solvent.

* * * * *

UNITED STATES PATENT AND TRADEMARK OFFICE
CERTIFICATE OF CORRECTION

| | | |
|---|---|---|
| PATENT NO. | : 7,098,269 B2 | Page 1 of 1 |
| APPLICATION NO. | : 09/781148 | |
| DATED | : August 29, 2006 | |
| INVENTOR(S) | : David Charles Lyons et al. | |

It is certified that error appears in the above-identified patent and that said Letters Patent is hereby corrected as shown below:

Column 10, claim 12

Line 48, delete the word "binder" and replace with --fiber--.

Signed and Sealed this

Twenty-sixth Day of December, 2006

JON W. DUDAS
*Director of the United States Patent and Trademark Office*